US007989781B2

(12) United States Patent
Patel

(10) Patent No.: US 7,989,781 B2
(45) Date of Patent: Aug. 2, 2011

(54) DETECTOR FOR A UV FALSE POSITIVE OF RADIATION SENSITIVE DEVICES

(76) Inventor: Gordhanbhai N. Patel, Middlesex, NJ (US)

( * ) Notice: Subject to any disclaimer, the term of this patent is extended or adjusted under 35 U.S.C. 154(b) by 71 days.

(21) Appl. No.: 11/413,505

(22) Filed: Apr. 28, 2006

(65) Prior Publication Data

US 2009/0173890 A1  Jul. 9, 2009

Related U.S. Application Data

(60) Provisional application No. 60/680,804, filed on May 14, 2005, provisional application No. 60/684,036, filed on May 24, 2005.

(51) Int. Cl.
*G01N 21/78* (2006.01)
(52) U.S. Cl. .................................................. 250/474.1
(58) Field of Classification Search ................ 250/474.1, 250/472.1, 473.1
See application file for complete search history.

(56) References Cited

U.S. PATENT DOCUMENTS

| 3,894,238 | A |   | 7/1975  | Cox et al. ............... 250/484.3 |
|-----------|---|---|---------|-------------------------------------|
| 3,999,946 | A |   | 12/1976 | Patel et al. .................. 422/56 |
| 4,389,217 | A | * | 6/1983  | Baughman et al. ............. 436/2 |
| 4,970,137 | A |   | 11/1990 | Lewis et al. ............... 430/296 |
| 5,002,852 | A |   | 3/1991  | Lewis et al. ............... 430/270.1 |
| 5,084,623 | A |   | 1/1992  | Lewis et al. ............... 250/474.1 |
| 5,203,067 | A | * | 4/1993  | DeFazio ..................... 29/403.3 |
| 5,232,820 | A |   | 8/1993  | Lewis et al. ............... 430/338 |
| 5,637,876 | A |   | 6/1997  | Donahue et al. .......... 250/474.1 |
| 5,731,112 | A |   | 3/1998  | Lewis et al. ................ 430/15 |
| 6,160,046 | A | * | 12/2000 | Bleikolm et al. ............. 524/284 |
| 6,285,031 | B1 |  | 9/2001  | Listl et al. ................. 250/474.1 |
| 6,406,914 | B1 | * | 6/2002 | Kaburaki et al. ................ 436/1 |
| 6,504,161 | B1 | * | 1/2003 | Jackson et al. ............. 250/474.1 |
| 7,141,350 | B2 |  | 11/2006 | Hall ............................ 30/270.1 |
| 7,589,331 | B2 | * | 9/2009 | Havens et al. ............. 250/474.1 |
| 2005/0064323 | A1 | * | 3/2005 | Hall ........................ 430/270.1 |
| 2005/0208290 | A1 |  | 9/2005 | Patel ............................ 428/323 |
| 2006/0145091 | A1 | * | 7/2006 | Patel ........................ 250/474.1 |
| 2008/0023647 | A1 | * | 1/2008 | Patel ........................ 250/473.1 |
| 2009/0224176 | A1 | * | 9/2009 | Patel ........................ 250/474.1 |
| 2009/0289202 | A1 | * | 11/2009 | Yakimov et al. .......... 250/473.1 |

FOREIGN PATENT DOCUMENTS

| GB | 718 537 | 11/1954 |
| GB | 1 188 095 | 4/1970 |
| WO | WO2004/077097 | 9/2004 |
| WO | WO 2004077097 A2 * | 9/2004 |

OTHER PUBLICATIONS

WO2006/124594, Republished with search report on Dec. 28, 2006, Linder.
PCT/US2006/018439, International Search Report, Oct. 23, 2006, Eberle.

* cited by examiner

*Primary Examiner* — David P Porta
*Assistant Examiner* — David S Baker
(74) *Attorney, Agent, or Firm* — Barbara V Maurer

(57) ABSTRACT

Disclosed is a detector for monitoring a UV false positive from genuine X-ray positive of color developing radiation sensitive devices. A layer which can be scratched off and is opaque to undesired radiation but transparent to X-ray is printed on the sensor. If the sensor displays a signal (i.e., develops color), whether it is genuine or false positive can be confirmed by scratching off the opaque layer. If the signal is a genuine positive, the whole sensor will be uniformly exposed/colored including the area under the opaque layer. If it is a false positive, the area under the scratched off layer will be of lighter color than the rest of the sensor.

18 Claims, 7 Drawing Sheets

DETECTOR FOR A UV FALSE POSITIVE OF RADIATION SENSITIVE DEVICES

CROSS-REFERENCE TO RELATED APPLICATIONS

This invention claims priority to U.S. Provisional Patent Appl. No. 60/680,804 filed May 14, 2005 and to U.S. Provisional Patent Appl. No. 60/684,036 filed May 24, 2005 both of which are pending and both of which are incorporated herein by reference.

STATEMENT REGARDING FEDERALLY SPONSORED RESEARCH

This invention was made in part with government support under contract W91 CRB-04-C-0001 awarded by the Technical Support Working Group (funded by Departments of Homeland Security, State, Justice and Defense).

BACKGROUND OF THE INVENTION

1. Field of the Invention

This invention relates to a device for detecting a false positive in color developing radiation sensitive devices for use in monitoring high energy radiation, such as X-ray.

2. Brief Description of Prior Art

Radiation sensitive materials, such as diacetylenes (R—C≡C—C≡C—R, where R is a monovalent group) and processes that can be used for, making radiation sensitive coatings or strips for self-indicating instant radiation alert dosimeter (referred herein to as SIRAD) are described in patent application numbers WO 2004/077097 and WO 2004/017095 and references cited therein both of which are incorporated herein by reference. Coatings, films or plaques of radiation sensitive materials used to make SIRAD are individually or collectively, referred herein to as "radiation sensitive coating", "radiation sensitive strip" or "sensing strip" or "sensor". The radiation sensitive dosimeter (SIRAD) is typically made by sandwiching a sensitive strip between two plastic layers, one being completely opaque with the other being transparent. The dosimeter is used for monitoring low dose (1-1,000 rads) of high energy radiation, such as X-ray, gamma ray, electrons and neutrons.

Diacetylenes are the preferred sensing materials used in sensing strips for monitoring X-ray irradiation. Unfortunately, diacetylenes are also sensitive to UV light which creates a potential false signal. In order to make the sensing strip less sensitive to UV light, UV absorbers may be added in the coating formulation and the sensing strip may be further protected with a UV absorbing film. However, the sensing strip of SIRAD is still sensitive to prolonged exposure to UV and/or sunlight, e.g., a day of sunlight. Due to the sensitivity the sensing strip can be accidentally or unintentionally over exposed to sunlight thereby provide a positive reading. The observer is unable to distinguish if the positive reading is due to UV exposure or high energy radiation. At the same time, someone can tamper with the strips by exposing the sensing strip to sunlight and claiming that he/she has been exposed to ionizing radiation. Hence, there is a need for detecting a false positive due to the likelihood of unintentional or intentional exposure to UV/sunlight.

Due to the propensity for false positive signals it has been a long felt desire to provide a method and system of detecting false positive signals with a simple technique which can be done with minimal or no training.

SUMMARY OF THE INVENTION

It is an object of the present invention to provide a radiation detector which can determine if a positive signal is false or due to high energy radiation.

It is a further object of the present invention to provide a radiation detector which can separately determine if the device has been exposed to UV light and/or sunlight, high energy radiation such as X-ray or both high energy radiation and UV light/sunlight.

A particular feature of the present invention is the simplicity of operation due to the utilization of removable layers such as scratch-off layers, peel off layers or layers which can be removed by solvent.

Another particular feature of the present invention is the ability to differentiate between genuine and false positive by comparing the color of an area covered under the removable layer with that of an area which is not covered by the removable layer.

Another particular feature of the present invention is the ability to quantify exposure to radiation visually by comparing to a color reference chart, by optical densitometer or spectrophotometer all in the same sample.

Yet another particular feature of the present invention is the ability to separately quantify interfering exposure and high energy exposure thereby eliminating the loss of critical information in the event of an exposure to radiation which is not desirable.

Yet another particular feature of the present invention is the ability to monitor false signals and tampering from internal changes.

These and other advantages, as will be realized, are provided in a radiation sensitive, color developing device for monitoring high energy radiation. The device has a sensor capable of changing optical density wherein the optical density is proportional to a dose of high energy radiation. A transparent layer is provided over the sensor and a removable opaque layer is provided over a portion of the sensor.

Yet another embodiment is provided in a process for detecting and distinguishing high energy radiation and low energy radiation. The process includes:
preparing a sensor capable of changing optical density when exposed to high energy radiation and low energy radiation;
attaching a protective layer over the sensor wherein the protective layer is transparent to both high energy radiation and low energy radiation;
attaching a removable layer to one of the sensor or the protective layer wherein the removable layer covers a portion of the sensor and is opaque to the low energy radiation and transparent to the high energy radiation thereby forming a layered sensor;
radiating the layered sensor with a first dose of high energy radiation and a second dose low energy radiation to form a first density area on the sensor corresponding to an area covered by the removable layer and a second density area corresponding to an area not covered by the removable layer; and
removing the removable layer and measuring a first density in the first density area wherein the first density is correlated to the first dose.

Yet another embodiment is provided in a process for detecting and distinguishing a positive signal from a false positive signal. The process includes:
preparing a sensor capable of changing density when exposed to high energy radiation and low energy radiation;

attaching a protective layer over the sensor wherein the protective layer is transparent to both high energy radiation and low energy radiation;

attaching a removable layer to one of the sensor or the protective layer wherein the removable layer covers a portion of the sensor and is opaque to the low energy radiation and transparent to the high energy radiation thereby forming a layered sensor;

radiating the layered sensor with a first dose of high energy radiation and a second dose low energy radiation to form a first density area on the sensor corresponding to an area covered by the removable layer and a second density area corresponding to an area not covered by the removable layer;

removing the removable layer;

measuring a first density in the first density area wherein the first density is correlated to the first dose and if the first dose is above a predetermined threshold a positive signal is indicated; and measuring a second density in the second density area wherein the second density is correlated to the second dose and if the second dose is above a predetermined threshold a false positive signal is indicated.

DETAILED DESCRIPTION OF PREFERRED EMBODIMENTS

Figure 1:
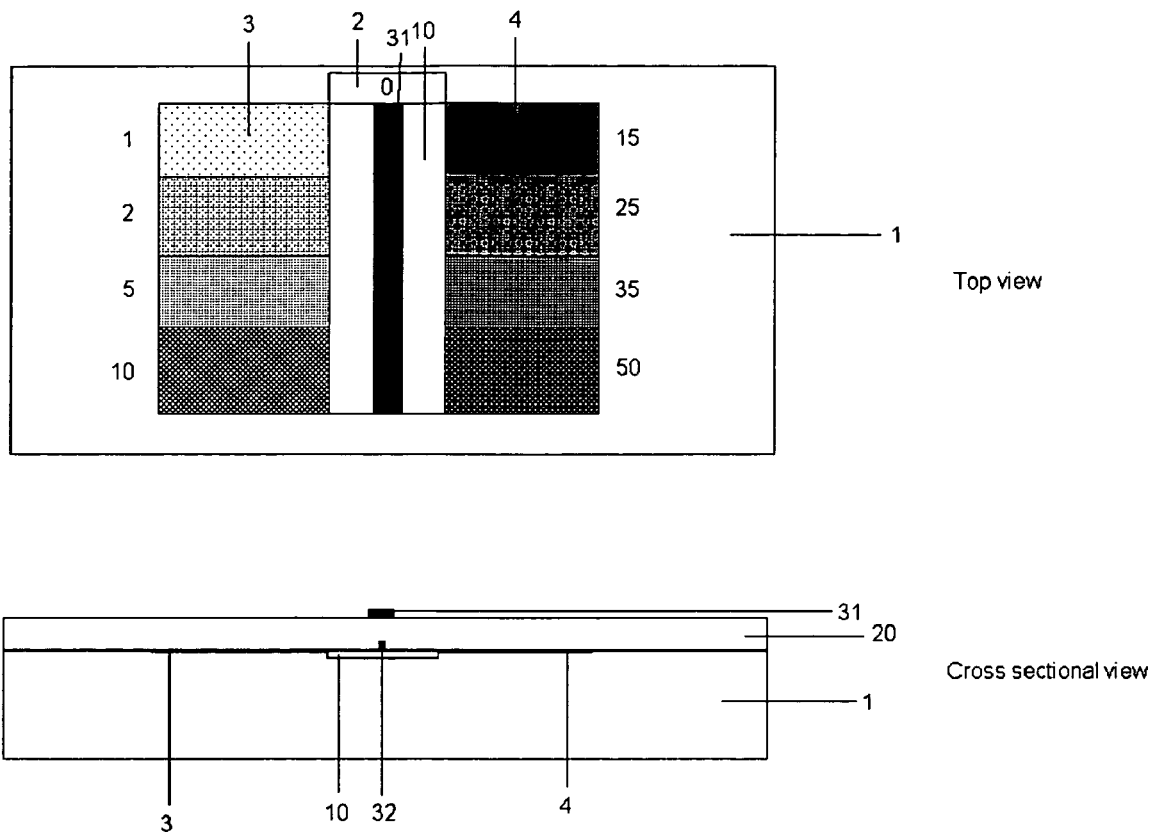
FIG. 1 is a schematic top and cross sectional presentation of a SIRAD card.

Disclosed is a radiation sensitive, color developing device for monitoring high energy radiation having at least one removable opaque layer on at least one surface of the top transparent layer covering a portion of the sensor or having at least one removable opaque layer on the sensor itself.

The invention can be best described by reference to the Figures forming an integral part of the present disclosure. In the figures similar elements will be numbered accordingly.

The radiation sensitive device for monitoring high energy radiation, such as X-ray radiation comprising a radiation sensitive strip 10 on a bottom layer 1 of the device. Printed thereon is a color reference chart illustrated in form of bars 2, 3 and 4 preferably in the vicinity of the sensing strip 10. A top layer 20 has printed thereon a first removable opaque layer 31 and a second opaque layer 32 which is preferably smaller than the first opaque layer and between the first opaque layer and the sensing strip. Both opaque layers are preferably smaller, or cover less surface area, than the sensing strip 10 and both opaque layers are preferably between the sensing strip 10 and the radiating source. The first removable opaque layer protects the sensing strip from undesired radiation and is preferably formed from a material capable of shielding the sensing strip form undesirable radiation. Both the first opaque layer 31 and second opaque layer 32 are transparent to the high energy radiation being selectively monitored such as X-ray, electrons and neutrons and hence will let them pass through unattenuated. For the purposes of the present invention high energy radiation has a wavelength of less than about 1 nm and low energy radiation has a wavelength of at least about 200 nm.

It is preferred that the first and second opaque layers are opaque to undesirable energy, however, they may be different thereby allowing for the determination of multiple sources of error.

Figure 2:
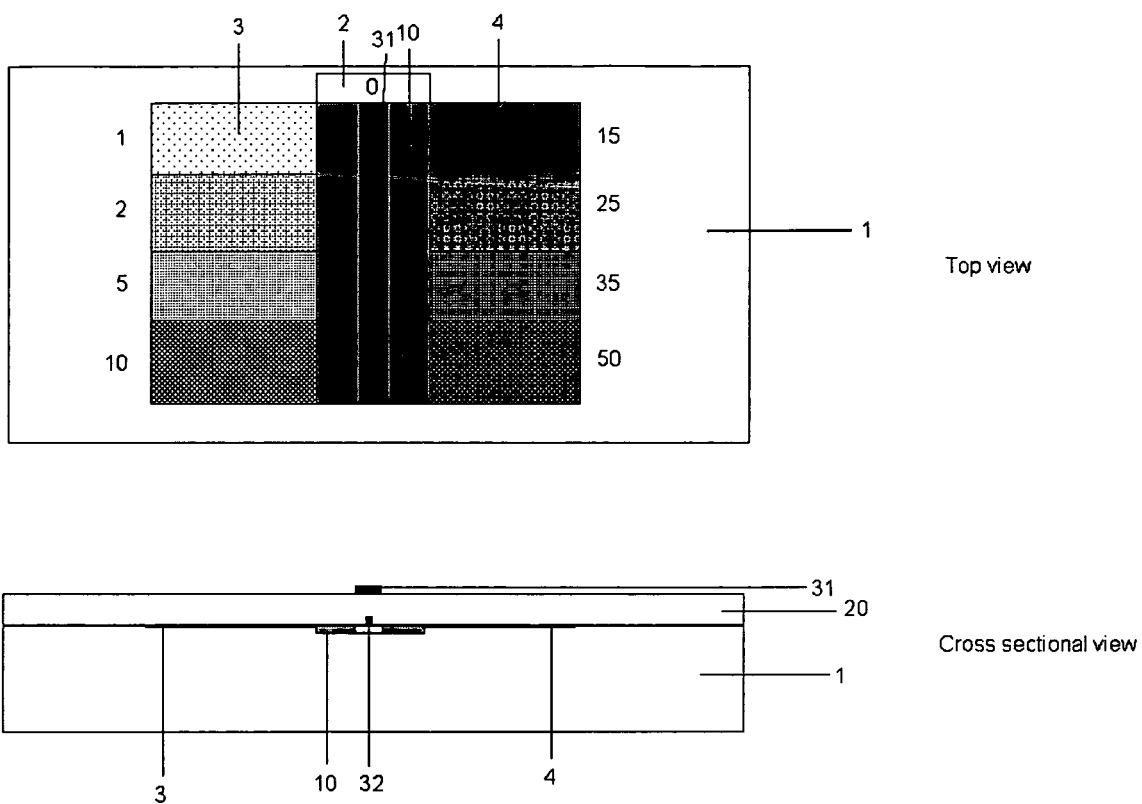
FIG. 2 is a schematic top and cross sectional presentation of a radiated SIRAD card.

During use, the device of FIG. 1 can unintentionally or accidentally be exposed to UV radiation from a manmade light or natural sunlight. It is also likely that someone may intentionally over expose the device to UV/sunlight. This will make the sensing strip (10) develop color as shown in FIG. 2 except for the penumbra region which is protected by the first opaque layer (31). The UV exposed portion of the sensing strip develops color due to polymerization of diacetylenes by UV light. The first opaque layer 31, being opaque to UV light, protects the portion of the sensing strip under it from developing color. However, the portion of the sensing strip under the first opaque layer can not be viewed until the first opaque layer is removed thereby allowing for a comparison of that portion exposed by UV and that area protected by the first opaque layer.

Figure 3:
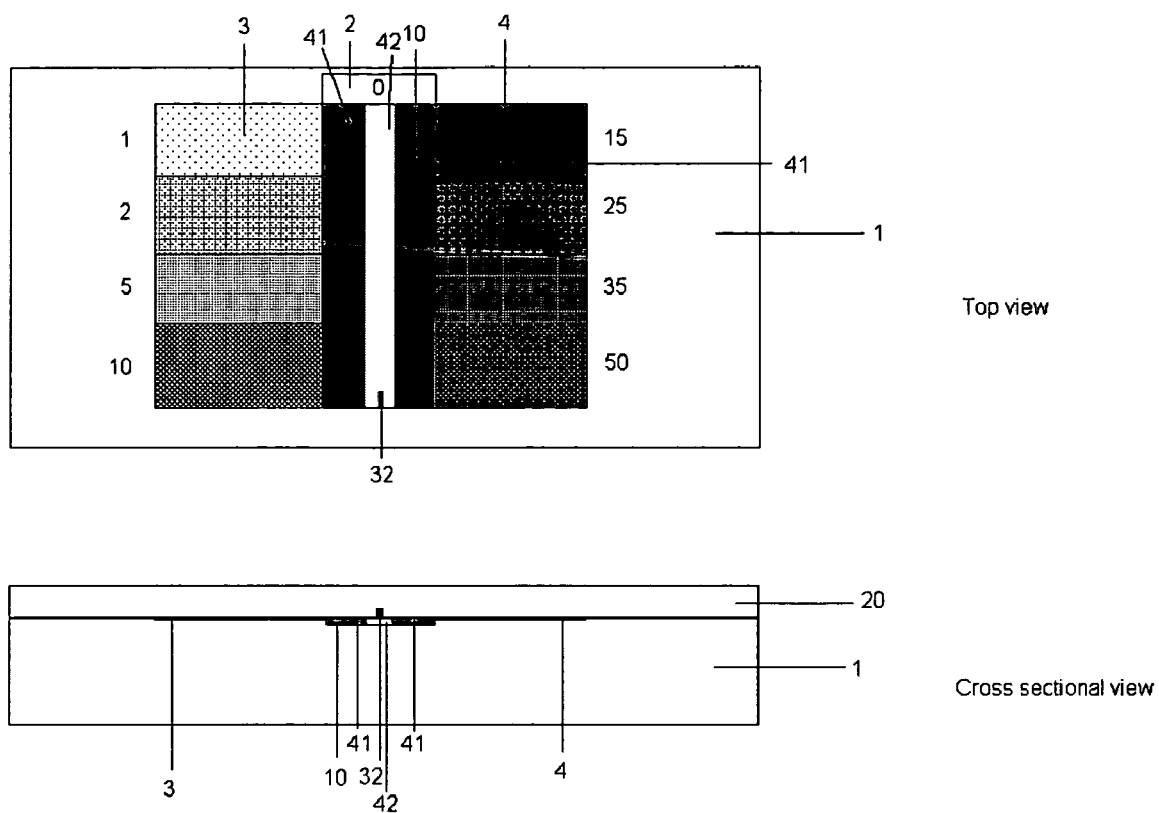
FIG. 3 is a schematic top and cross sectional presentation of a SIRAD card displaying a false positive.

When the first opaque layer 31 is removed, as shown in FIG. 3, the area 42 of the sensing strip under that was under the first opaque layer will be not display color development because UV light will not penetrate the layer 31. The exposed portion 41 does display color. Thus removal of the first opaque layer 31 indicates a false positive. However, the second opaque layer 32 printed under the first opaque layer 31 will become visible after removal of the first opaque layer. The area under the second opaque layer will still remain unaffected by UV light and can be used in case of any dispute or the necessity to confirm the initial results.

Figure 4:
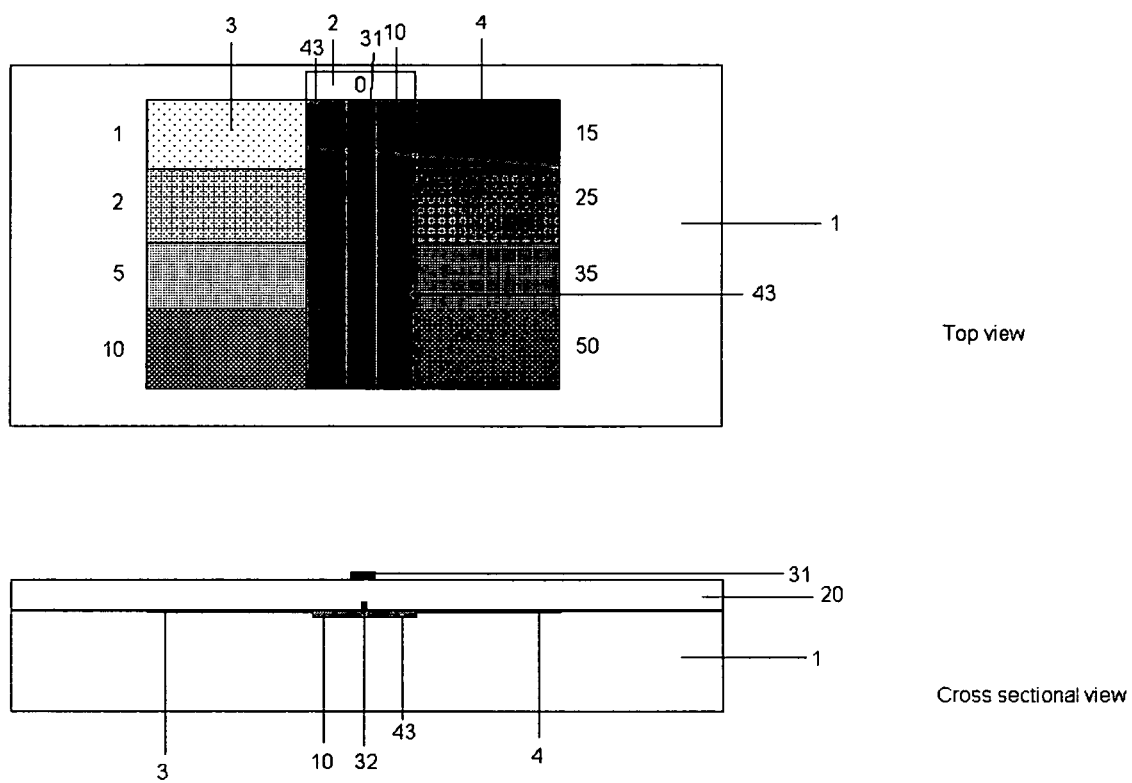
FIG. 4 is a schematic top and cross sectional presentation of a SIRAD card displaying a genuine exposure.
Figure 5:
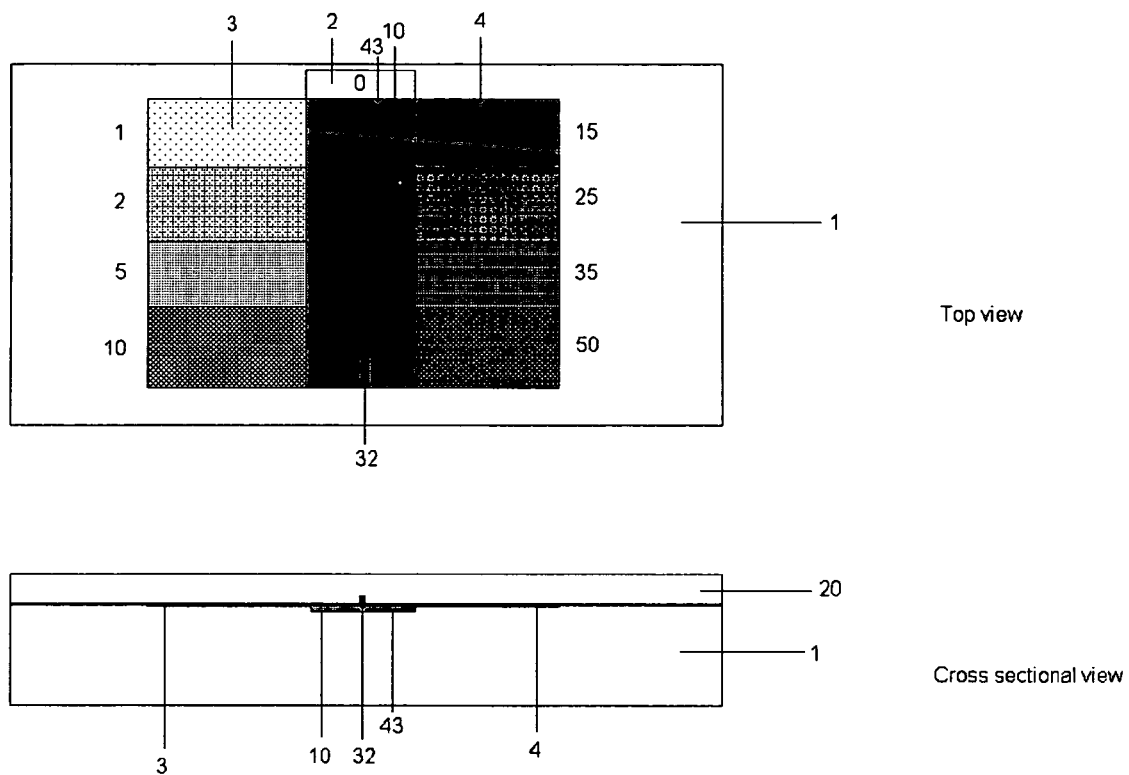
FIG. 5 are SIRAD cards having removable opaque bars before and after radiation with UV/sunlight and X-ray and after partial removal of the opaque bar.

During use, the device of FIG. 1 can also get exposed exclusively to high energy radiation, such as X-ray. The X-ray will make the whole sensing strip 10 develop color (43) as shown in FIG. 4 with no differentiation between the color density under the first opaque layer and the density not under the first opaque layer. With the first opaque layer in place it is difficult to differentiate the X-ray exposure from over exposure to UV light. The genuine exposure can be differentiated from the false positive or tamper only by removing first opaque layer 31. When the first opaque layer 31 is removed, the X-ray exposed sensing strip will be of the same color through out as shown in area 43 in FIG. 5.

It is also likely that the sensing strip may get exposed to UV/sunlight and X-ray. In such a case, the area under the first opaque layer 31, will be slightly colored but lighter than the rest of the sensing strip. In such an event, the dose will be determine from the color intensity of the sensing strip under the scratched off layer with realization that additional UV exposure has occurred. By difference the density due to UV exposure can be quantified.

Figure 7:
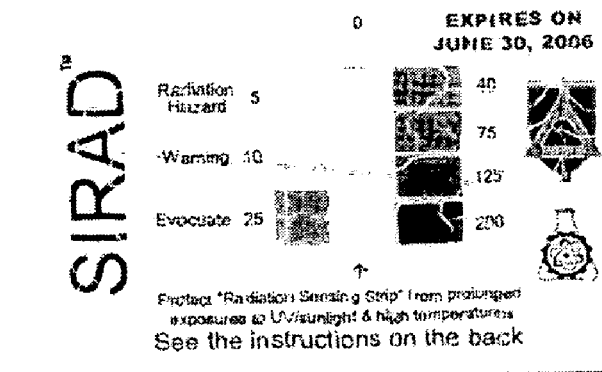
FIG. 7 shows physical deformation a layer of a SIRAD card after heating.

FIG. 7 shows physical destruction of an Indigo$^R$ color printing of a SIRAD card made by reaction injection molding upon heating the card at 80° C. for a day. The cracking of the color coating occurs because of uneven expansion of different layers. In this case the Indigo$^R$ color coating expands less than the layer(s) above and/or below. The color coating being thinner gets cracked. This indicates additional tampering or energy absorption which may or may not interfere with the density due to high energy radiation.

Often it is not necessary to have an external indicator for monitoring a false positive signal or indications of tampering. One can take advantage of some internal indicators. Sometimes the materials used for making the dosimeters, such as radiation sensitive chemicals (e.g., diacetylenes), additives (e.g., heat stabilizer and UV absorbers) used for making the sensors, films and coatings, also have the ability to detect/monitor many processes such as exposure to UV/sunlight, prolonged exposure to time and temperature (shelf life), heating or cooling above or below a pre-determined temperature and physical tampering can be used for monitoring processes such as false positive, false negative, inactivation/archiving, aging, shelf life, shelf life expiration, UV exposure and/or physical tampering. All these materials and processes are referred herein as internal indicators and indicating processes respectively.

When exposed to temperatures higher or lower than room temperature, the card/dosimeter and its components can undergo a physical change such as deformation, bending, curling, expansion, contraction, cracking, softening, hardening, brittleness, weakening, strengthening, change in smoothness or roughness, drying out, de-lamination, de-gassing, bubble creation, change in adhesion/bonding, diffusion or migration of chemicals and additives, reaction among and between additives and binders. The diffusion of ambient environment/chemicals including water and water vapor, such as during a laundry cycle, can also be used for monitoring processes such as false positive, false negative, inactivation/archiving, aging, shelf life, shelf life expiration, and/or UV exposure and physical tampering. These and other similar processes can be visually noticed or can be quantitatively monitored/determined by analytical equipment and techniques, such as with microscopy, spectroscopy, physical and chemical testing techniques and the like.

If exposed to UV/sunlight, the card/dosimeter or its components (e.g., diacetylenes, additives, printing, inks, binders and polymer films) can undergo changes such as de-coloration, color development, color changes, or the aforementioned physical changes. A photo reaction among and between additives and binders can also be used for monitoring processes such as false positive, false negative, inactivation/archiving, aging, shelf life and shelf life expiration. These and other similar processes introduced by UV/sunlight can be visually noticed or can be quantitatively monitored/determined by analytical equipment and techniques, such as all kinds of microscopy, spectroscopy, physical and chemical testing techniques and alike.

Many of the above mentioned phenomenon are observed during heat and UV exposure of SIRAD cards made with different materials. For example, de-gassing of additives and residual solvent, cracking of coating, deformation, e.g., curling and bending of the cards, bending, diffusing out of additives of the sensor and de-lamination, color changes of coating and reaction between additives have been observed.

We made a dual-sensor SIRAD dosimeter, a fast sensor (for monitoring 0-50 rads) developing blue color from a diacetylene while the other slow sensor (for monitoring 0-1,000 rads) developing red color from another diacetylene. We discovered that the kinetics of color development of the blue-developing sensor upon exposure to X-ray, UV and thermal annealing were different from those of the red-developing sensor. Not only these sensors developed different colors and color intensities upon exposure to X-ray but the rate of color development upon exposure to UV light and that upon thermal annealing were also different. Thus, by determining the color of the blue-developing and red-developing sensor, it is possible to determine if someone tampers the dosimeters either with UV light and/or upon thermal annealing. Thus, the dual sensor SIRAD can be an internally self-indicating for false positive and tampering. We also discovered that by selecting proper diacetylenes, additives, binders and procedures for making the sensors, it is possible to make a dual-sensor dosimeter whose kinetics of color development upon exposure to X-ray will be different from that upon exposure to UV light and upon thermal annealing.

Figure 8:
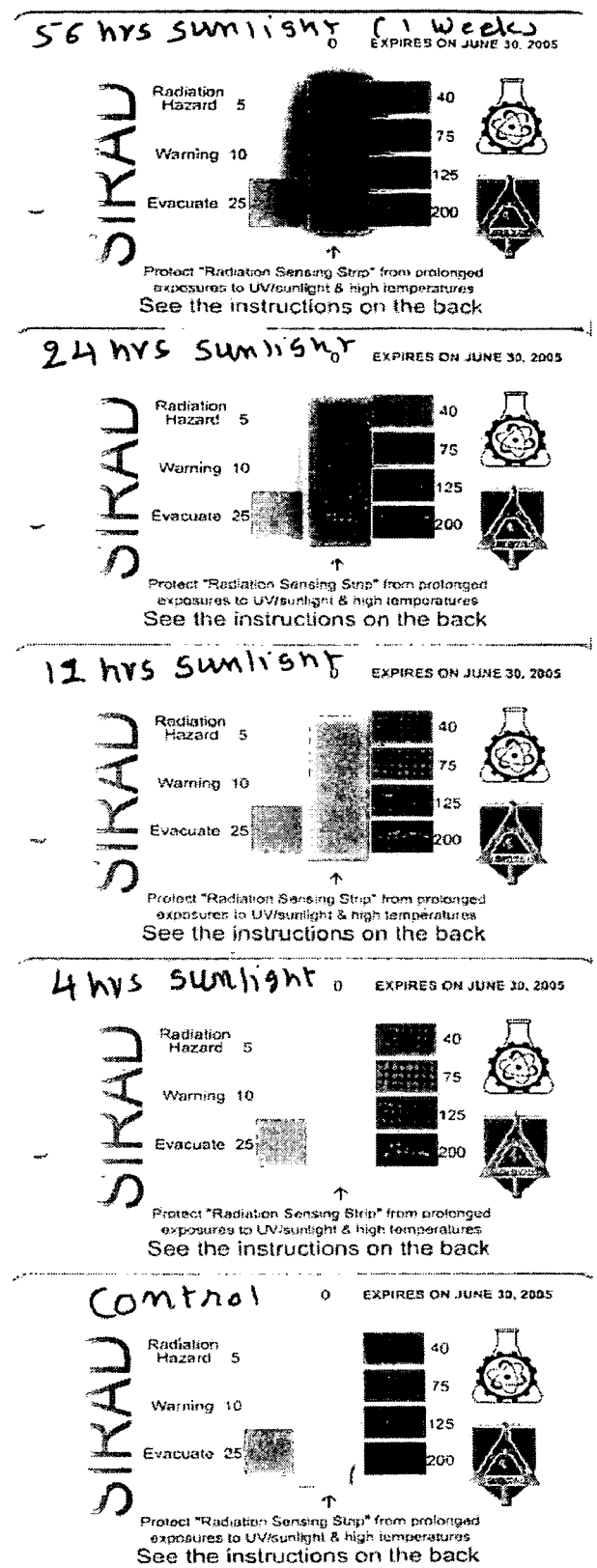
FIG. 8 illustrates an internal indicator of the present invention.

An example of an internal indicator is illustrated in FIG. 8. In FIG. 8 a SIRAD sample is illustrated with progressively increasing exposure to sunlight. Unlike a high-radiation exposure the UV exposure, from natural sunlight, causes a halo to appear around the sensing strip. This halo indicates a false positive. The false positive reading can be confirmed by removal of the removable layer as further described herein.

The first and second opaque layer could be any type of coating containing opaque particles and can be white, colored or black. The coating can also comprise, or consist of, a dark or black dye. Pigments are preferred as they are usually opaque. The opaque coating can be made from any opaque ink as long as the coating can be removed, preferably by scratching off. The removable opaque layer could also be made by evaporation or sputtering of metals such as aluminum. It could contain metallic flake to selectively filter off X-ray and/or electrons of lower energies. The opaque layer can also be a piece of material such as an opaque film or foil attached or glued over the sensor.

The first and second opaque layers are preferably bound to the transparent layer in a manner that allows the opaque layer to be easily removable, such as by light scratching, to very difficult to remove. The bonding should be sufficiently strong that the removable layer should maintain its integrity through out the normal useful life of the dosimeter. It is preferred that the layer be removable by scratching such as with a fingernail, coin or similar element. It could also have a very strong bonding with the top transparent layer but still removable by other techniques, such as with a solvent.

The opaque layers can be continuous or broken. It could be straight, zigzag, cross or any other irregular shape. It may also be in the form of a word such as "TAMPER", "ERROR" or "EXPOSURE" to clearly indicate an incorrect reading of the primary energy of interest.

The first opaque layer should, preferably, be smaller than the size of the sensing strip, preferably ½ to 1/10 of the size of the sensing strip. It could be along or across or on the top or bottom of the sensing strip.

The second opaque layer does not have to be removable but is preferably smaller than the first opaque layer. In the case of a dispute, the transparent top layer of the dosimeter can be carefully peeled off and the exposure dose can be determined from the color of sensing strip under the second opaque layer.

The color development and dose corresponding to dose can be estimated visually by comparing with the color reference chart or the density can be quantified by an optical densitometer, spectrophotometer, CCD camera or similar devices and correlated to density.

The opaque layers could also be sandwiched between two thin layers as well.

The opaque layer should be able to absorb most of UV and visible light.

The SIRAD cards may have more than one sensors with at least one sensor protected by an opaque layer. It is more preferable that each sensor have associated therewith an opaque layer which is removable preferably by scratching.

The scratch off bar can be printed with any printing process such as inkjet, laser toner, screen printing, gravure printing, flexographic printing, letter press printing and offset printing. Screen printing is most preferred.

The SIRAD may further comprise additional indicators such as thermal indicators, aging indicators, shelf life indicators and physical tampering indicators.

The dosimeter cards could be made by techniques and materials described in commonly assigned PCT Patent Application # WO2004077097 titled "Personal And Area Self-Indicating Instant Radiation Alert Dosimeter"; U.S. Provisional Patent Application No. 60/790,100 mailed Apr. 8, 2006 titled "Dual Dose Monitoring System, One Being Self-Indicating"; U.S. patent application Ser. No. 11/269,147 filed Nov. 8, 2005 titled "A Stick-on Self-indicating Instant Radiation Dosimeter"; and U.S. patent application Ser. No. 11/235,892 filed Sep. 27, 2005 titled "Tamper Resistant Self Indicating Instant Alert Radiation Dosimeter" each of which is incorporated in entirety herein by reference.

EXAMPLES

The following Examples are illustrative of carrying out the claimed invention but should not be construed as being limitations on the scope and spirit of this invention.

Example 1

Making of a Dosimeter with Removable Layer

A transparent 50 micron thick UV absorbing polyethylene terephthalate (PET) film having a pressure sensitive adhesive and release paper on one side was printed on the other side with thin 2 mm×25 mm layers using black and white inks from different suppliers. The black bars were printed with an ink jet printer and also with a toner printer. The printed film was used as a top protective layer. Sensing strips were prepared by cutting an approximately 200 microns thick coating of a diacetylene/binder on a polyester film into 8 mm×25 mm segments. The sensing strips were placed in cavities of credit card sized plastic cards pre-printed with a color reference chart. The release paper of the printed top protective PET film was removed and film was applied on to the card in such a way that the opaque bar (2 mm×25 mm) is over and at the center of the sensing strip (8 mm×25 mm). The opaque/black bars printed with inkjet ink were easy to scratch off compared to those printed by a toner printer on the top PET film. The opaque bars printed with commercially available solvent based inks were very difficult to scratch off.

Example 2

Figure 6:
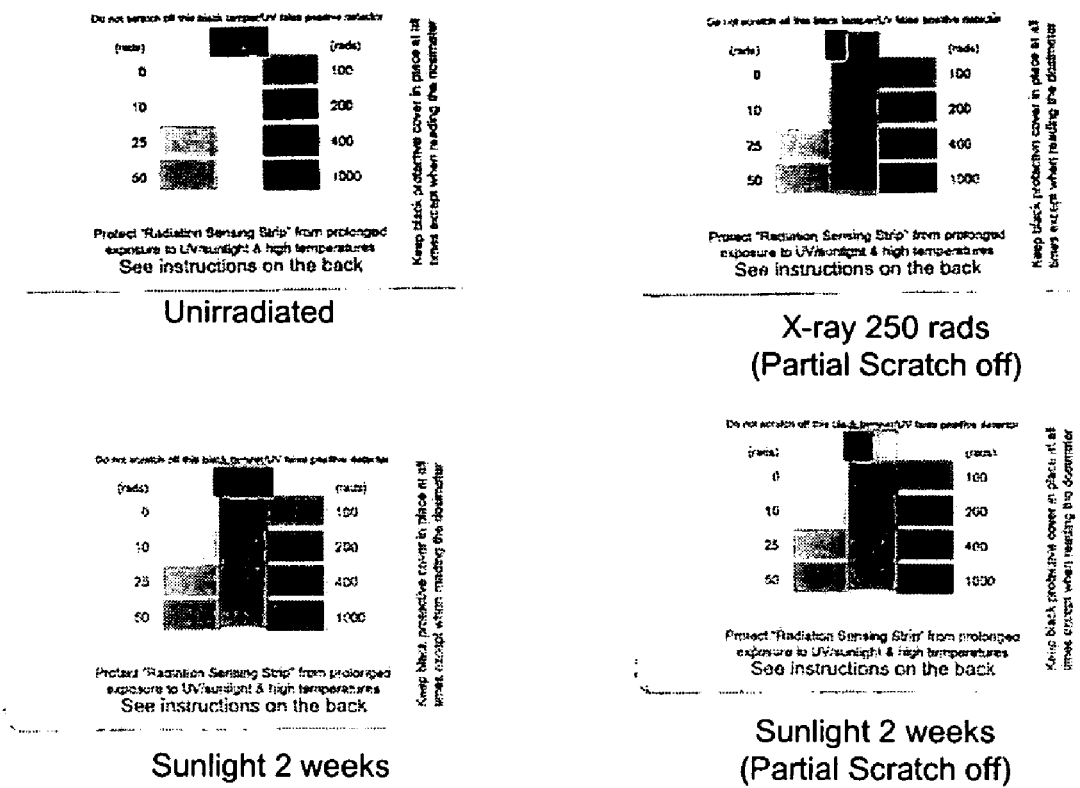
FIG. 6 shows SIRAD cards having a scratch off bar exposed to sunlight and X-ray.

Detecting False Positive from Genuine X-ray Exposures for 0-1,000 rads SIRAD Cards A number of 0-1,000 rad SIRAD cards were made with black scratch off bars printed by a screen printing process on the sensing strip as shown in top left hand photo of FIG. 6 were made in accordance with Example 1. The cards were first exposed to sunlight for a week as shown in bottom left hand side photo and then with 250 rads of 100 KeV X-ray. The visible portion of sensing strips had developed essentially identical blue color and it was impossible to differentiate X-ray exposed card from that exposed to UV/sunlight. After the exposures, a portion of the scratch off bars was scratched off. The color of area of the sensing strip under the scratch off bar of the X-ray exposed card was blue and the intensity of the blue color was identical to the rest of the sensing strip as shown in the top right hand photo of FIG. 6. The color of area of the sensing strip under the scratch off bar of the sunlight exposed card was almost colorless white with a faint blue tint and can be easily differentiated from the blue color of the rest of the sensing strip as shown in the bottom right hand photo of FIG. 6. Thus, UV/sunlight false positive can be detected and differentiated from the genuine X-ray exposure.

Example 3

Differentiation of False Positive and Genuine X-ray Exposures in 0-200 rads SIRAD Cards Commercially available 0-200 rads dosimeter cards made by JP Laboratories, Inc, Middlesex, N.J. were printed with an opaque black bar going across the sensing strip. The cards were then exposed (1) to sunlight for a day, (2) with 50 rads of 100 KeV X-ray and (3) with sunlight for a day and 50 rads of X-ray. The visible exposed areas of the sensing strips developed blue color. After the exposures the opaque bars were removed either by scratching off. The area of the sensing strips under the scratched off bar of the dosimeter cards exposed to sunlight were white (very similar to unexposed control), while those exposed to X-ray were uniformly blue. The area of the sensing strips under the scratched off bar of the dosimeter cards exposed to both sunlight and X-ray were lighter blue compared to the rest of the sensing strip and equivalent to that exposed to 50 rads of X-ray.

The invention has been described with particular reference to the preferred embodiments. One of skill in the art would readily realize additional embodiments and alterations which are within the scope of the invention as set forth in the claims appended hereto.

Claimed is:

1. A radiation sensitive, color developing device for monitoring high energy radiation comprising:
   a sensor capable of changing optical density wherein said optical density is proportional to a dose of said high energy radiation;
   a transparent layer over said sensor;
   a removable opaque layer over a portion of said transparent layer over said sensor further comprising a second opaque layer wherein said second opaque layer is smaller than said removable opaque layer.

2. The radiation sensitive, color developing device for monitoring high energy radiation of claim 1 wherein said second opaque layer and said removable opaque layer cover less surface area than said sensor.

3. The radiation sensitive, color developing device for monitoring high energy radiation of claim 1 wherein said second opaque layer and said removable opaque layer are between said sensor and said high energy radiation.

4. The radiation sensitive, color developing device for monitoring high energy radiation of claim 1 wherein said second opaque layer is removable.

5. The radiation sensitive, color developing device for monitoring high energy radiation of claim 4 wherein said second opaque layer is removable by scratching.

6. The radiation sensitive, color developing device for monitoring high energy radiation of claim 1 wherein said second opaque layer is a coating.

7. The radiation sensitive, color developing device for monitoring high energy radiation of claim 6 wherein said coating comprises opaque particles.

8. The radiation monitoring device of claim 1 wherein said opaque layer is removable by wiping or scratching and wherein said opaque layer is smaller than said transparent layer.

9. A process for detecting radiation comprising:
providing a device of claim 1 wherein said opaque layer is removable by wiping or scratching and wherein said opaque layer is smaller than said transparent layer;
removing said opaque layer;
comparing a sensor change under said opaque layer to a sensor change which was not under said opaque layer;
wherein said sensor change under said opaque layer is a high energy exposure and said sensor change not under said opaque layer comprises additional change due to an environmental exposure.

10. The radiation sensitive, color developing device for monitoring high energy radiation of claim 1 further comprising an environmental indicator for detecting at least one of exposure to time, temperature, time-temperature, shelf life, shelf life expiration, false positive, false negative, UV exposure, tampering, inactivation and archiving.

11. The radiation sensitive, color developing device for monitoring high energy radiation of claim 1 attached to a user clothing or equipment.

12. The radiation sensitive, color developing device for monitoring high energy radiation of claim 1 further comprising an opaque layer.

13. The radiation sensitive, color developing device for monitoring high energy radiation of claim 1 further comprising a shelf life extender.

14. The radiation sensitive, color developing device for monitoring high energy radiation of claim 1 wherein said sensor comprises a diacetylene.

15. The radiation sensitive, color developing device for monitoring high energy radiation of claim 1 further comprising at least one color reference chart comprising at least one color corresponding to said detectable color change at a predetermined level of ionizing radiation.

16. The radiation sensitive, color developing device for monitoring high energy radiation of claim 1 in the form of a sticker or badge.

17. A radiation sensitive, color developing device for monitoring high energy radiation comprising:
a sensor capable of changing optical density wherein said optical density is proportional to a dose of said high energy radiation;
a transparent layer over said sensor;
a removable opaque layer over a portion of said transparent layer over said sensor further comprising a second opaque layer wherein said second opaque layer is between said removable opaque layer and said sensor.

18. The radiation sensitive, color developing device for monitoring high energy radiation of claim 17 wherein said removable opaque layer covers at least $1/10$ to no more than one half of said sensor.

* * * * *